Patented Mar. 16, 1948

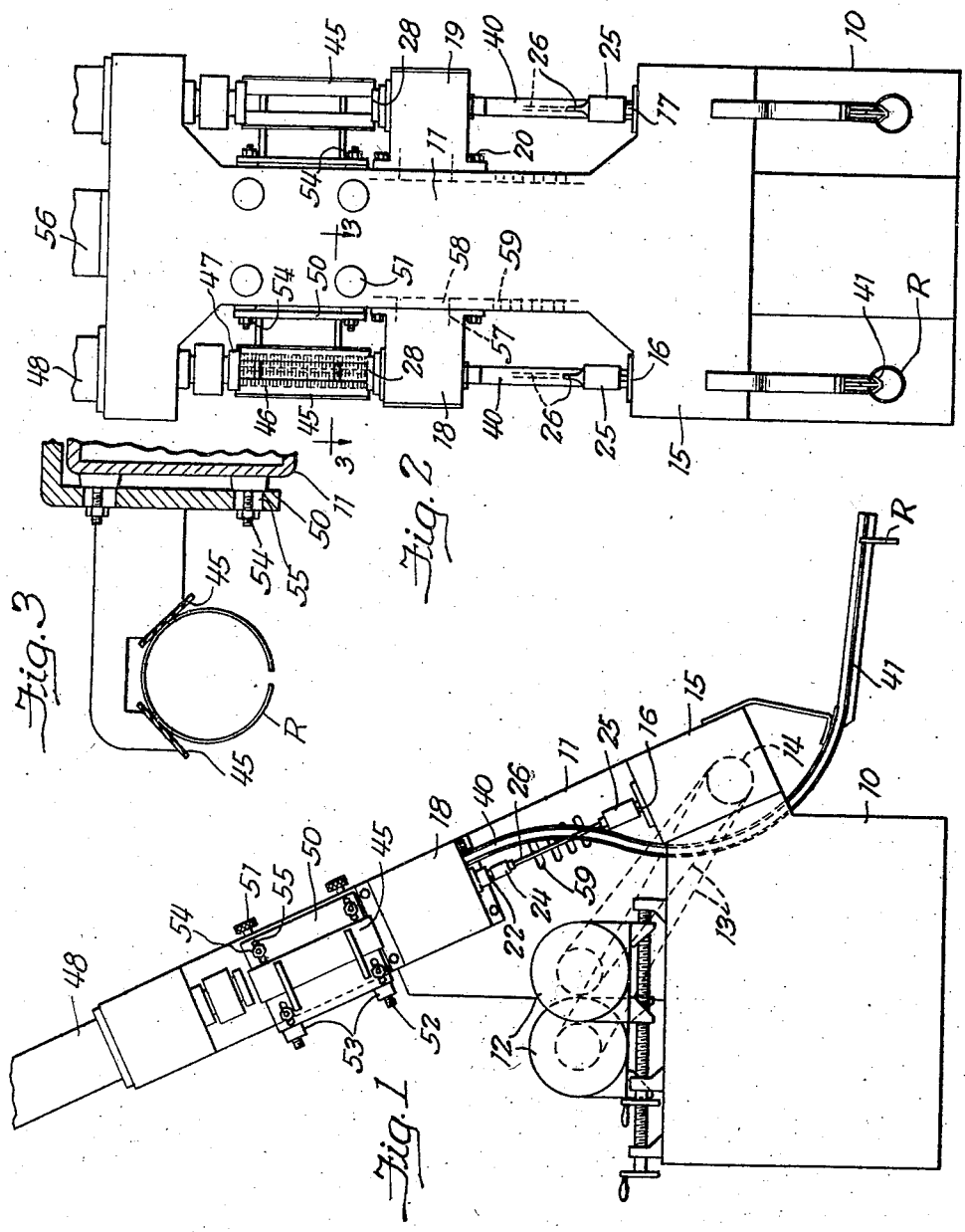

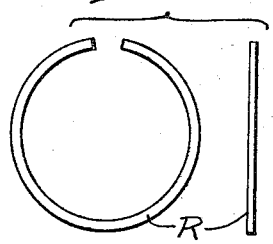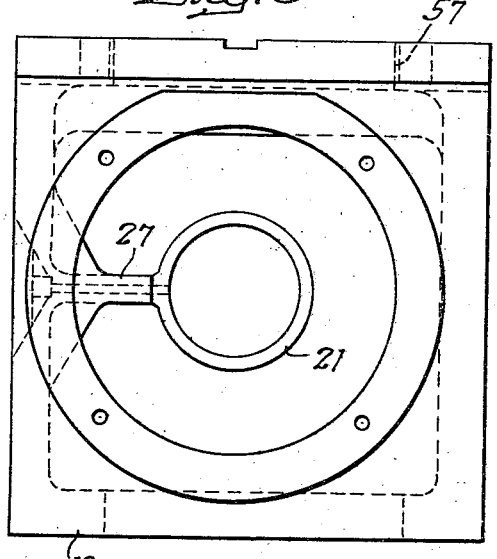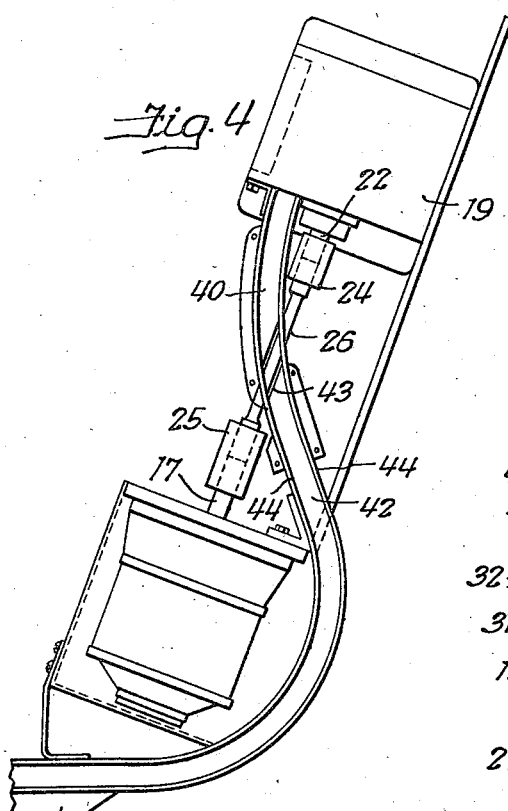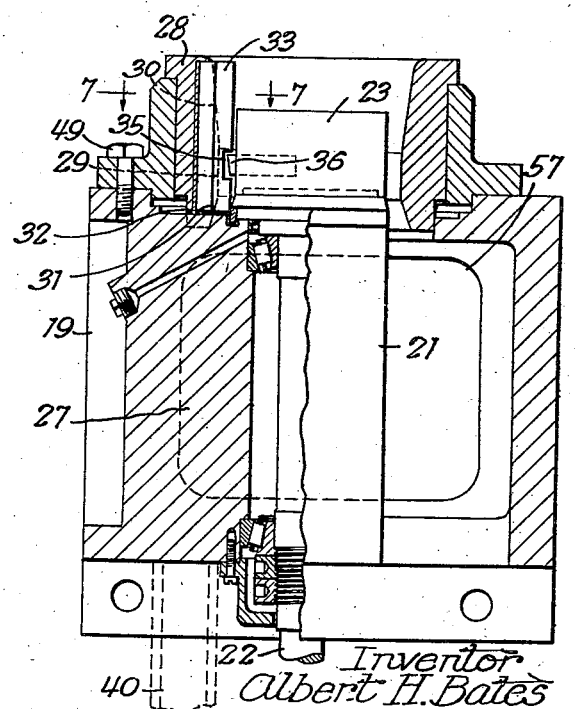

2,437,676

UNITED STATES PATENT OFFICE 2,437,676

PISTON RING BORING MACHINE

Albert H. Bates, Rockford, Ill.

Application January 1, 1945, Serial No. 570,993

6 Claims. (Cl. 77—1)

This invention relates to boring machines, and is more particularly concerned with the provision of an improved piston ring boring machine embodying certain novel features of the combination turning and boring machine disclosed in my copending application, Serial No. 506,342, filed October 15, 1943.

The principal object of my invention is to provide a machine in which piston rings that have been previously split and rough and finish turned externally can be accurately bored as they are moved at a feed rate through a bore, the rings being held properly positioned normal to the axis of operation by tight contact of the opposed faces of each ring with neighboring rings in the stack being fed through the bore, each ring being furthermore held against displacement radially by contact with the bore.

The piston ring boring machine of my invention comprises a hollow upright frame with housings mounted thereon and supporting sizing rings for centering the piston rings to be bored by engagement therewith about their peripheries, the rings being placed in stacks over the sizing rings and moved downwardly through the sizing rings to be operated upon by boring heads mounted in the housings in concentric relation with the sizing rings to bore the rings as they are moved through the sizing rings past said heads. The frame or column being of hollow construction forms a discharge passage to a suction conduit and the housings mounted thereon communicate with the inside of the column so that the bulk of the chips resulting from the boring operation can be conducted away to a waste receptacle instead of littering the floor around the machine. Any finer particles left on the rings as they emerge from the bore in the aforesaid member and which are apt to be shaken off as the rings drop down the discharge chute are drawn into the column through other openings located in that vicinity, so that the rings leaving the machine are quite clean.

The machine of my invention lends itself well to a duplex design with boring heads and related facilities on opposite sides of the column, so that there need never be any interruption in the boring of the rings, inasmuch as a single operator can man the machine and load a stack of rings to be bored in the trough on one side of the machine and arrange such rings while the boring head on the other side of the machine is engaged in the boring of another stack previously loaded into the machine, and vice versa.

The invention is illustrated in the accompanying drawings, in which—

Fig. 1 is a side view of a piston ring boring machine made in accordance with my invention;

Fig. 2 is a face view of the machine taken at right angles to the column;

Fig. 3 is a sectional detail taken on the line 3—3 of Fig. 2;

Fig. 4 is a side view of the right-hand lower portion of the machine on a larger scale;

Figs. 5 and 6 are two views of the upper housing member shown in Fig. 4, showing the boring head in Fig. 6 and the sizing ring defining the restricted portion of the bore at the point where the boring operation is performed, and showing in Fig. 5 the rib that supports the hollow bearing hub in which the shaft driving the boring head is mounted;

Fig. 7 is a section on an enlarged scale showing the expander type spring blade provided in the sizing ring, the section being taken on the line 7—7 of Fig. 6, and Fig. 8 is a face view and edge view of a piston ring such as the machine of my invention is adopted to operate upon.

The same reference numerals are applied to corresponding parts throughout the views.

The machine comprises a base 10 supporting a hollow column 11 that is inclined rearwardly from the vertical to the extent indicated in Fig. 1 for a purpose which will soon appear. Electric motors 12 are adjustably mounted on top of the base 10 and have belt drive connections as indicated at 13 with suitable transmission means 14 in the lower portion 15 of the column for driving the shafts 16 and 17 mounted in suitable bearings in the lower portion 15 of the column and extending upwardly, as shown, on opposite sides of and parallel to the column 11. Housings 18 and 19 are bolted onto the opposite sides of the column 11, as indicated at 20, and provide bearings 21 therein for support of shafts 22 on which the boring heads 23 of the machine are carried. Coupling sleeves 24 and 25 provided on the opposite ends of intermediate shaft sections 26 of reduced diameter, serve to connect the shafts 22 with the shafts 16 and 17 to transmit drive to the boring heads 23. The shaft sections 26 are small enough in cross section to pass freely through the gaps of the piston rings and inasmuch as these shaft sections are weaker than the driving and driven shafts to which they are connected by the couplings 24—25, it is of advantage to have these shaft sections removable to permit replacement easily should breakage occur. The couplings 24—25 in that event can be slipped endwise with respect to the intermediate shaft sections to permit removal and replacement thereof.

Each of the bearings 21 is of hollow cylindrical form and supported in the housing 18 or 19, as the case may be, by a rib 27 cast integral therewith and extending throughout the length thereof, said rib being preferably cast integral with the supporting housing, as clearly indicated in Figs. 5 and 6. A sizing ring 28 is mounted in the intake end of each of the housings 18 and 19 and is smoothly and accurately finished and highly polished. The smallest inside diameter 29 is sized closely to suit the ring size being handled, the intake portion of the bore is tapered toward the restricted portion as indicated at 30, and the discharge end of the bore is flared abruptly from this restricted portion as indicated at 31. The sizing ring 28 is notched at 32 to receive the adjacent end of the rib 27 whereby to locate the sizing ring angularly with respect to the rib and align the guide rib 33 in the ring with the rib 27. The guide rib 33 is of spring blade construction to give an expanding or spreading pressure on the opposite ends of the ring at the gap and accordingly insure accurate sizing of weaker rings, the inherent spring action of which in some cases is not sufficient to insure their expanding to a tight fit in the restricted throat portion 29 of the sizing ring even though they have been compressed by passage through the tapered portion 30 of the bore. This guide blade 33, as clearly appears in Fig. 7, is of U-shaped cross section and has the arms 34 extending substantially radially inwardly relative to the piston ring R so that the two end portions have sliding engagement in the ring gap and serve to expand the ring to the full inside diameter of the sizing ring. A portion of the guide blade 33 is cut away, as indicated at 35 in Fig. 6, to avoid interference with the tool or tools 36 projecting from the periphery of the boring head for operation on the inner diameter of the rings R, enough of the guide blade being left projecting from the restricted throat portion 29 of the sizing ring to insure keeping the rings that are being operated upon expanded to the full extent. The insert 37 of soft metal has one side of the middle or C-bend portion of the spring blade suitably fastened thereto as by brazing, indicated at 38, and the blade 33 is preferably fastened so that the torsional reaction due to the machining on the inner diameter is assumed by the freely movable and yieldable arm 34, namely the right arm shown in Fig. 7, whereby to take full advantage of the resilience of the blade 33 in absorbing the shocks and thus have less danger of the blade being broken or breaking free from its support.

A discharge chute 40 of ogee curved form serves to convey the rings by their gaps from the housing 18 or 19, as the case may be, after the boring operation, the chute extending from the lower end of the rib 27 downwardly and rearwardly, as indicated in Figs. 1 and 4, so as to pass the gaps of the rings over the shaft section 26, the rings thereafter being directed forwardly onto substantially horizontal racks 41 where a large number of rings can be collected. The rings will be removed from the racks 41 by the operator for transfer to another machine, as for example, where the rings require a milling operation to finish the cut in the gap. The chute 40 is of I-section, the web portion 42 being cut away at 43 where the shaft section 26 extends through the chute, but the flange portions 44, between which the end portions of the ring are guided as in channel tracks, are continuous and have only holes provided therein at the point where the shaft section 26 extends through the chute.

Elongated V troughs 45, the sides of which are in right angle relationship, as clearly appears in Fig. 3, are disposed in longitudinal alignment with the shafts 22 and with the sides of the troughs substantially tangent to the outer or intake ends 30 of the sizing rings 28 so that the troughs serve as guides for cylindrical stacks of rings, as indicated at 46 in Fig. 2, when the rings are being moved through the sizing rings 28 at a feed rate for the bore operation. A ram 47 cooperates with each trough 45 and operates in a hydraulic cylinder 48 provided on the upper end of the cilumn 11. This hydraulic mechanism is arranged to be actuated by a commercial high-pressure hydraulic pump and is arranged to be regulated by commercial hydraulic controls to perform the following cycle: Starting from rest with the piston rod of the ram within the cylinder, a hand-trip starts the quick approach, followed by a controlled feed to whatever length stroke is desired, and at the end of the stroke the ram trips a lever and the ram returns automatically to its starting point and is ready for the next cycle, when a new stack 46 of rings R are to be bored is placed in the trough 45. The controls mentioned, being commercial devices, have not been shown because they are so well known and are used almost universally in the machine tool industry. The sizing rings 28 are detachably secured to the housings 18 and 19, as indicated at 49, and other rings having a larger inside diameter in the throat portion 29 are provided for use in the boring of larger sized rings. When a change is made in the sizing rings to operate on larger sized rings, the supports 50 for the troughs are adjusted rearwardly by the adjustment of screws 51 that are rotatably mounted in the column 11 and held against endwise movement with respect thereto and have their threaded rear end portions 52 threaded in bosses 53 provided in the rear end of the plates 50. The adjustment is such that the sides of the V are substantially tangent to the circle defined by the outer or intake end 30 of the sizing ring installed. Bolts 54 which extend from the sides of the column 11 through elongated slots 55 in the plates 50 are arranged to be tightened to fasten the troughs 45 securely in adjusted positions.

A suction conduit 56 communicates with and extends from the upper end of the hollow column 11 and serves to conduct chips and smaller metal particles that result from the boring operation from the machine so that the floor around the machine will not be littered. The chips and the bulk of the finer metal particles are discharged from the housings 18 and 19 directly into the column 11 through the openings 57 in the inner walls of the housings which register with openings 58 provided in the side walls of the column. Any particles not discharged at that point are given a second opportunity for discharge through slots 59 provided in the side walls of the column in vertically spaced relation below the housings 18 and 19. The freshly bored rings, as they drop by gravity along the rib 27 and down the chute 40, are jostled sufficiently to knock off any finer particles that otherwise might tend to adhere to the rings, and it is these finer particles which pass through the slots 59 for discharge from the machine through the duct 56.

The operation of the machine is as follows: Split rings R are grouped in cylindrical stacks like that shown in 46 in Fig. 2 and placed in the troughs 45 under the rams 47 with their gaps in alignment with the rib 27 and guide blade 33. The rearward inclination of the troughs 45 is advantageous from the standpoint that the stacks of rings can be placed therein easily and the stacks tend to gravitate toward and rest securely in the troughs. The operator, after placing a stack of rings in a trough, trips a starting lever and the ram 47 advances, giving a controlled feed. The second and succeeding loads move the endmost rings of the previous load down into and through the sizing rings 28 and as the rings advance through the tapered portion 30 they are compressed until they reach the restricted throat portion 29, which determines the correct outside diameter in relation to the inside diameter being bored. Each ring remains compressed in the throat portion 29 of the sizing ring throughout the boring operation and for an interval thereafter, the rings being free to expand when they reach the flared outlet end 31 of the bore in the sizing ring. The fact that there are rings ahead and behind the particular ring being bored, insures the ring being held absolutely normal to the axis of rotation of the boring head 23. At the outset, the first group of rings fed through the machine will be dummy rings that are finished rings and hence are larger in inside diameter than the ring blanks to be bored. These dummy rings will pass through the sizing ring 28 and past the boring head 23 without being machined thereby and when the throat 29 is filled with dummy rings the first group of ring blanks to be bored can be placed in the trough 45 for passage through the machine. In that way these rings to be bored are assured of proper support in the boring operations, the dummy rings ahead of these rings affording the required head resistance to movement of the stack of rings to maintain the rings being bored under uniform pressure axially, so as to prevent displacement and insure the desired accuracy in production.

It is believed the foregoing description conveys a good understanding of the objects and advantages of my invention. The appended claims have been drawn to cover all legitimate modifications and adaptations.

I claim:

1. A ring boring machine, comprising in combination a hollow frame, a housing mounted thereon and supporting a sizing ring for centering rings to be bored by engagement therewith about their peripheries, means for supporting a stack of rings in coaxial face to face relationship and substantially concentric to said sizing ring preliminary to their movement through said sizing ring, means for moving said rings through said sizing ring, a boring head mounted in said housing concentric with said sizing ring for boring the rings as they are moved through said sizing ring past said head, said housing having an exhaust opening therein communicating with the inside of said frame, and an exhaust conduit adapted to be connected with suitable exhaust means and connected to said frame and communicating with the inside thereof.

2. A machine as set forth in claim 1, including means extending from the housing for supporting and discharging the rings after they pass said boring head, said frame having one or more exhaust openings provided therein on that side of said housing adjacent said means.

3. A ring boring machine, comprising in combination a hollow frame, housings mounted on diametrically opposite sides of said frame, each supporting a sizing ring to be bored by engagement therewith about their peripheries, means cooperating with each of said housings for supporting a stack of rings in coaxial face to face relationship and substantially concentric to said sizing ring preliminary to their movement through said sizing ring, means cooperating with each of said housings for moving said rings through said sizing rings, a boring head mounted in each of said housings concentric with said sizing rings for boring the rings as they are moved through said sizing rings past said head, each of said housings having an exhaust opening therein communicating with the inside of said frame, and an exhaust conduit adapted to be connected with suitable exhaust means and connected to said frame and communicating with the inside thereof.

4. A machine as set forth in claim 3, including means extending from the housings for supporting and discharging the rings after they pass said boring heads, said frame having one or more exhaust openings provided therein on that side of said housings adjacent said means.

5. A ring boring machine, comprising in combination a hollow frame, a housing mounted thereon and supporting a sizing ring for centering rings to be bored by engagement therewith about their peripheries, means for supporting a stack of rings in coaxial face to face relationship and substantially concentric to said sizing ring preliminary to their movement through said sizing ring, means for moving said rings through said sizing ring, a boring head mounted in said housing concentric with said sizing ring for boring the rings as they are moved through said sizing ring past said head, an exhaust conduit adapted to be connected with suitable exhaust means and connected to said hollow frame and communicating with the inside thereof, and means extending from the housing for supporting and discharging the rings after they pass said boring head, said frame having one or more exhaust openings provided on that side of said housing adjacent said means.

6. A ring boring machine, comprising in combination a hollow frame, housings mounted on diametrically opposite sides of said frame, each supporting a sizing ring to be bored by engagement therewith about their peripheries, means cooperating with each of said housings for supporting a stack of rings in coaxial face to face relationship and substantially concentric to said sizing ring preliminary to their movement through said sizing ring, means cooperating with each of said housings for moving said rings through said sizing rings, a boring head mounted in each of said housings concentric with said sizing rings for boring the rings as they are moved through said sizing rings past said head, an exhaust conduit adapted to be connected with suitable exhaust means and connected to said hollow frame and communicating with the inside thereof, and means extending from the housings for supporting and discharging the rings after they pass said boring heads, said frame having one or more exhaust openings provided therein on that side of said housings adjacent said means.

ALBERT H. BATES.

REFERENCES CITED

The following references are of record in the file of this patent:

UNITED STATES PATENTS

| Number | Name | Date |
| --- | --- | --- |
| 2,373,344 | Scarff | Apr. 10, 1945 |
| 1,946,881 | Porter | Feb. 13, 1934 |
| 2,182,939 | Brinkman | Dec. 12, 1939 |
| 2,410,819 | Haling | Nov. 12, 1946 |